United States Patent [19]

Ueda et al.

[11] Patent Number: 4,680,360

[45] Date of Patent: Jul. 14, 1987

[54] PROCESS FOR PRODUCING POLY(ALLYLAMINE) DERIVATIVES

[75] Inventors: Toshio Ueda, Koriyama; Yoshinori Sato, Fukushima; Susumu Harada, Koriyama, all of Japan

[73] Assignee: Nitto Boseki Co., Ltd, Fukushima, Japan

[21] Appl. No.: 671,004

[22] Filed: Nov. 13, 1984

[30] Foreign Application Priority Data

Nov. 14, 1983 [JP] Japan ................................ 58-213699
Nov. 18, 1983 [JP] Japan ................................ 58-216359

[51] Int. Cl.$^4$ .......................... C08F 4/04; C08F 26/02
[52] U.S. Cl. ................................. 526/310; 526/218.1; 526/219.1; 525/377; 525/374; 564/485; 564/468
[58] Field of Search ................ 564/485, 468; 526/310, 526/218.1, 219.1; 525/377, 374

[56] References Cited

U.S. PATENT DOCUMENTS 4,504,640  3/1985  Harada et al. ...................... 526/310
4,540,760  9/1985  Harada et al. ...................... 526/310

Primary Examiner—John Kight
Assistant Examiner—M. L. Moore
Attorney, Agent, or Firm—Bert J. Lewen; Henry Sternberg

[57] ABSTRACT

Poly(allylamine salts) of high polymerization degree is obtained in high yield by the polymerization of monoallylamine salt with a specified radical-polymerization initiator having in the molecule an azo group. Various poly(allylamine) derivatives are obtained by reacting said poly(allylamine salt) with acrylic compounds, or formic acid and formaldehyde.

5 Claims, No Drawings

PROCESS FOR PRODUCING POLY(ALLYLAMINE) DERIVATIVES

BACKGROUND OF THE INVENTION

1. Field of the Invention

This invention relates to a process for producing poly(allylamine) derivatives. More perticularly, it relates to the prcedures for producing reaction product of poly(allylamine) and an acrylic compound, and poly(N-methylated allylamine).

2. Description of the Prior Art i. Being a cationic polymer having a primary amino group, poly(allylamine) would be supposed to be highly reactive and to react with various compounds. Accordingly, if it is actually possible to introduce various substituent groups into poly(allylamine) by the reaction with various compounds, there will be provided a means to modify the properties of poly(allylamine) so as to meet the requirements of a particular use. This will be of industrial rignificance. It has, however, been not easy to obtain poly(allylamine) itself which is the starting material to prepare derivatives by the introduction of various groups. In the presence of common polymerization initiators, allylamine polymerizes to a polymer of low polymerization degree in a low yield. A poly(allylamine) of high polymerization degree is obtained only by the radiation polymerization. For several reasons, however, the radiation polymerization is not a technique accessible to anyone who desires to utilize it. Therefore, it has been difficult to produce on a commercial scale poly(allylamine) and, in turn, poly(allylamine) derivatives.

ii. Further, for instance, the primary amino group of poly(allylamine) is expected to undergo addition reaction with a compound having an unsaturated bond adjacent to an electron attracting group. Thus, when poly(allylamine) is reacted with acrylonitrile, cyanoethylation is expected to take place, resulting in introduction of highly polar cyano group into poly(allylamine); when reacted with acrylamide, there will occur carbamoylethylation, resulting in introduction of carbamoyl group capable of forming a strong hydrogen bond; when reacted with sodium salt of acrylic acid, there will occur carboxyethylation, resultihg in introduction of negative charge; and when reacted with an acrylic ester, there will occur introduction of a hydrophobic group into poly(allylamine). However, as described above, since poly(allylamine) is obtainable only by a very specific polymerization technique, there has heretofore been no commercial process for producing poly(allylamine) derivatives by the reaction with acrylic compounds. Therefor, such a commericial process has been strongly demanded to be available.

iii. Further, poly(N-methylated allylamine) is also expected to find several uses. However, when monomeric N-methylallylamine or N-dimethylallylamine is polymerized in the presence of common radical-polymerization initiators, there is obtained only a trace amount of low-molecular-weight poly(N-methylallylamine) or poly(N,N-dimethylallylamine). A process for producing poly(N-methylated allylamine) by the N-methylation of poly(allylamine) is conceivable but not commercially practicable, because, as described above, high-molecular-weight poly(allylamine) is obtained only by the specific technique of radiation polymerization. Therefor, the development of a commrecially feasible process has been awaited.

SUMMARY OF THE INVENTION i. Under the circumstances described above, the present inventors carried out an extensive study to develop a practicable process for producing poly(allylamine) derivatives which are expected to be formed by the reaction between poly(allylamine) and acrylic compounds and, as a result, found that the intended derivatives can be formed by converting the high-molecular-weight poly(allylamine salt) obtained above in a high yield into poly(allaylamine), and allowing the resulting poly(allylamine) to react with acrylic compounds. This invention is predicated upon this discovery. This invention provides a process for producing poly(allylamine) derivatives by polymerizing an inorganic acid salt of monoallylamine with a radical-polymerization initiator having an azo group in the molecule, converting the resulting poly(allylamine salt) into poly(allylamine), and reacting the latter with acrylic compounds.

ii. Further, the present inventors carried out an extensive study to develop a practicable process for producing poly(N-methylallylamine) and poly(N,N-dimethylallylamine) and, as a result, found that poly(N-methylated allylamine) is obtained in high yields by allowing the poly(allylamine salt) obtained above in a high yield or the poly(allylamine) obtained therefrom by the action of an alkali to react with formic acid and formaldehyde. This invention is predicated upon this discovery. The present invention provides a process for producing poly(N-methylated allylamine), which comprises polymerizing an inorganic acid salt of monoallylamine with a radical-polymerization initiator having an azo group in the molecule, and allowing the resulting poly(allylamine salt) or the poly(allylamine) obtained therefrom by the action of an alkali to react with formic acid and formaldehyde to produce poly(N-methylated allylamine) in high yields. The present invention is predicated puon this discovery. The present invention provides a process for producing poly(N-methylated allylamine), which comprises polymerizing an inorganic acid salt of monoallylamine with a radical-polymerization initiator having an azo group in the molecule, and allowing the resulting poly(allylamine salt) or the poly(allylamine) obtained therefrom by the action of an alkali to react with formic acid and formaldehyde.

DETAILED DESCRIPTION OF THE INVENTION i. In the present process for producing poly(allylamine) derivatives including poly(allylurea), derivatives of poly(allylamine) derived by the reaction with acrylic compounds, and poly(N-methylated allylamine), at first poly(allylamine salt) is produced by polymerizing an inorganic acid salts of monoallylamine with a polymerization initiator. The initiators used according to this invention are those having an azo group in the molecule. Typical examples are salts of the azo compounds represent by the following general formula [I]with inorganic or organic acids such as hydrochloric acid, sulfuric acid, phosphoric acid, alkylsulfuric acids, p-toluenesulfonic acid, formic acid, acetic acid, and propionic acid:

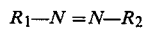

$$R_1-N=N-R_2 \qquad \text{I [I]}$$

wherein at least one, preferably both, of R₁ and R₂ is a group which contains a cationizable nitrogen atom and which is selected from the group consisting of aminoalkyl, aminoaryl, amidinylalkyl, amidinylaryl, aminoalkaryl, aminoaralkyl, amidinylalkaryl, amidinylalkaryl, cyanoaminoalkyl, and cyanoaminoalkaryl; when only one of R₁ and R₂ is a group containing a cationizable nitrogen atom, the other is a group selected from the group consisting of alkyl, aryl, alkaryl, aralkyl, cyanoalkyl, cyanoaryl, cyanoalkaryl, and cyanoaralkyl; and R₁ and R₂ may jointly form a single alkylene group represented by the general formula

     [II]

wherein R is a group selected from the group consisting of alkylene, alkylalkylene, and arylalkylene; covalent bonds (a) and (b) combine with each nitrogen atom of the azo group to form an azo-containing ring; and X is a group containing a cationizable nitrogen atom.

Of the initiators represented by the general formula [I], especially preferred are those having a secondary or tertiary carbon atom adjacent to the azo group. Typical of such compounds are as given below.

2,2′-Diamidinyl-2,2′-azopropane hydrochloride, 2,2′-diamidinyl-2,2′-azobutane hydrochloride, 2,2′-diamidinyl-2,2′-azopentane hydrochloride, 2,2-bis(N-phenylamidinyl)-2,2′-azopropane hydrochloride, 2,2′-bis(N-phenylamidinyl)-2,2′-azobutane hydrochloride, 2,2′-bis(N,N-dimethylamidinyl)-2,2′-azopropane hydrochloride, 2,2′-bis-(N,N-dimethylamidinyl)-2,2′-azobutane hydrochloride, 2,2′-bis(N,N-diethylamidinyl)-2,2′-azopropane hydrochloride, 2,2′-bis(N,N-diethylamidinyl)-2,2′-azobutane hydrochloride, 2,2′-bis(N-n-butylamidinyl)-2,2′-azopropane hydrochloride, 2,2′-bis(N-n-butylamidinyl)-2,2′-azobutane bydrochloride, 3,3′-bis(N,N-di-n-butylamidinyl)-3,3′-azopentane hydrochloride, azo-bis-N,N′-dimethyleneisobutyl-amidine hydrochloride.

Azonitriles of the quaternary ammonium salt type obtained by quaternizing, by means of dimethyl sulfate or methyl p-toluenesulfonate, such compounds as 2,2′-azobis(2-methyl-4-diethylamino)butyronitrile hydrochloride, 2,2′-azobis(2-methyl-4-dimethylamino)butyronitrile hydrochloride, 2,2′-azobis(2-methyl-4-diethyl-amino)butyronitrile hydrochloride, 2.2′-azobis(2-methyl-4-diethylamino)butyronitrile, or 2,2′-azobis(2-methyl-4-dimethylamino)butyronitrile.

3,5-Diamidinyl-1,2-diazo-1-cyclopentene hydrochloride, 3-methyl-3,4-diamidinyl-1,2-diazo-1-cyclopentene hydrochloride, 3-ethyl-3,5-diamidinyl-1,2-diazo-1-cyclopentene hydrochloride, 3,5-dimethyl-3,5-diamidinyl-1,2-diazo-1-cyclopentence hydrochloride, 3,6-diamidinyl-1,2-diazo-1-cyclohexene hydrochloride, 3-phenyl-3,5-diamidinyl-1,2-diazo-1-cyclopentene hydrochloride, 3,5-diphenyl-3,5-diamidinyl-1,2-diazo-1-lcyclopentence hydrochloride.

Since the process for polymerizing an inorganic acid salt of monoallylamine in the presence of an inorganic or organic acid salt of the azo compounds represented by the general formula [I]has been disclosed by the present inventors in Japanese Patent Application No. 54,988/83 (U.S. Pat. Ser. No. 379,983), details are omitted from the present specification.

Other typical examples of the initiators used in the polymerization of monoallylamine salts according to this invention are those represented by the following general formula [III]or [IV]:

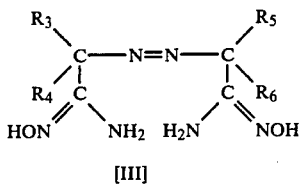

[III]

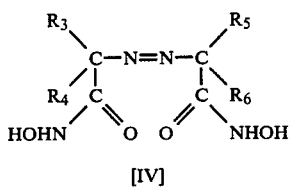

[IV]

wherein R₃, R₄, R₅ and R₆ are the same or different hydrocarbon radicals. Specially preferred hydrocarbon radicals, R₃, R₄, R₅ and R₆, are straight- or branched-chained alkyls having 1 to 4 carbon atoms, cycloalkyls having 3 to 6 carbon atoms, phenyl, and benzyl. R₃ and R₄ or/and R₅ and R₆ jointly with carbon atoms, to which the hydrocarbon radicals are attached, may form a ring. Especially preferred initiators of the formulas [III] and [IV] are as follows:

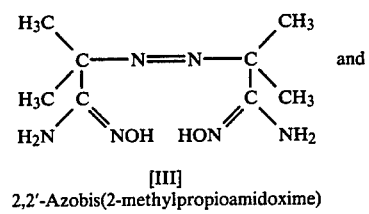

[III]
2,2′-Azobis(2-methylpropioamidoxime)

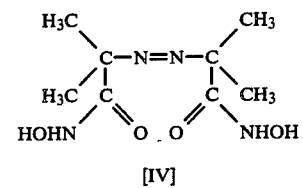

[IV]
2,2′-Azobis(2-methylpropionhydroxamic acid)

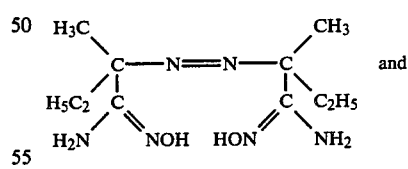

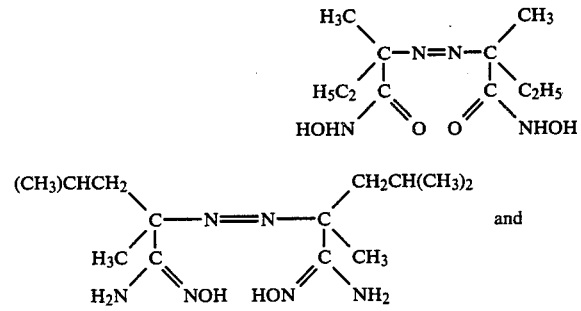

-continued

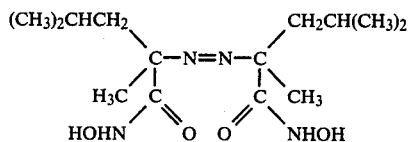

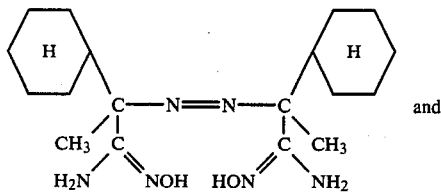 and

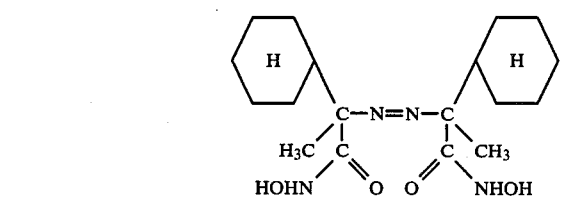

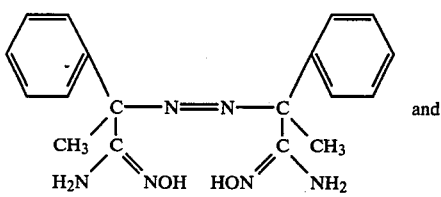 and

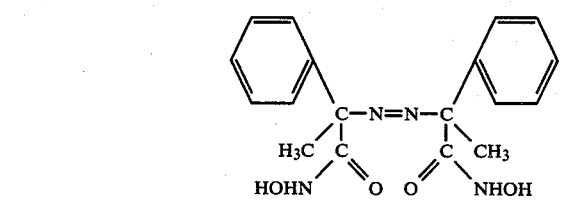

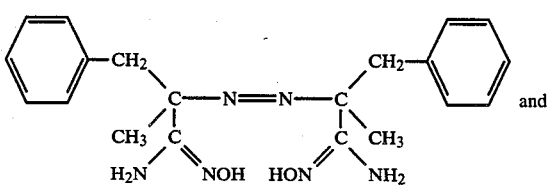 and

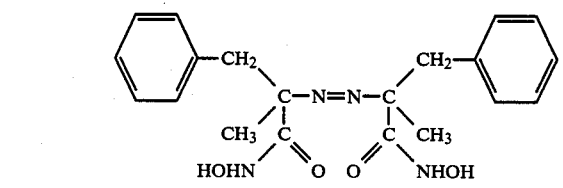

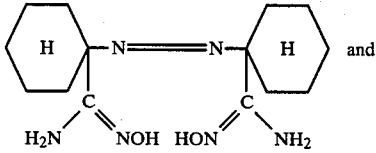 and

-continued

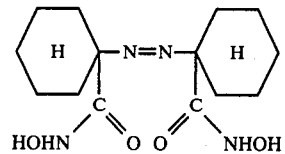

It is needless to say that the invention is not limited to these examples.

The process for polymerizing an inorganic acid salt of monoallylamine by using as initiator a compound of the general formula [III] or [IV] is disclosed by the present inventors in Japanese Patent Application, "A process for producing polymerized monoallylamine" (application date: Nov. 10, 1983).

The amount used of an intiator is 0.1 to 10, usually 1 to 6, % by weight based on the inorganic acid salt of monoallylamine. The polymerization temperature is 30° to 100° C., usually 40° to 70° C., depending upon the chemical structure of the initiator. The initial monomer concentration is higher the better within the solubility range. The concentration is usually 10 to 85% by weight. Preferable inorganic acid salts of monoallyamine are hydrochloride, sulfate, sulfite, and phosphate. The polymerization is carried out in polar solvents such as water, inorganic acids (e.g. hydrochloric acid, sulfuric acid, phosphoric acid, and polyphosphoric acid), aqueous solutions thereof, organic acids (e.g. formic acid, acetic acid, propionic acid, lactic acid, etc.), aqueous solutions thereof, alcohols, dimethyl sulfoxide, dimethylformamide, or aqueous solutions of inorganic saets (e.g. zinc chloride, calcium chloride, and magnesium chloride).

In carrying out the polymerization, although the inorganic acid salt of monoallylamine is used usually in the form of crystals separated from the mother liquor, yet it can be used in the form of solution in which the salt has been produced by the addition of monoallylamine and an inorganic acid to the polar solvent. When the inorganic acid or an aqueous solution thereof is used as the polymerization medium, it is of course possible to add a predetermined quantity of monoallylamine to the inorganic acid or the aqueous solution thereof and to allow the polymerization to take place in the resulting solution. The polymerization is carried out preferably in an inert gas such as nitrogen, because the atmospheric oxygen hinders the polymerization to some degrees.

ii. The preparation of poly(allylamine) derivatives by the reaction between the poly(allylamine salt) and an acrylic compound is carried out in the following manner:

At first, an aqueous solution of the poly(allylamine salt) is allowed to react with equimolar amount of a strong alkali such as sodium hydroxide. The reaction mixture is subjected to dialysis, ultrafiltration, or gel permeation to remove the by-product salt [sodium chloride when poly(allylamine hydrochloride) and sodium hydroxide were used], then dehydrated, and dried to yield poly(allylamine). Poly(allylamine) derivatives are obtained by reacting the resulting poly(allylamine) with acrylic compounds having an electron atracting group adjacent to the double bond, such as, for example, acrylonitrile, methacrylonitrile, acrylamide, methacrylamide, acrylic acid, methacrylic acid, acrylic esters, methacrylic esters, inorganic acid salts of acrylic acid, and inorganic acid salt of methacrylic acid. The detailed description of the procedure is given below.

The poly(allylamine) is dissolved in water, methanol, or a mixture of a polar solvent and water or methanol to a concentration of 5 to 60%. To the solution, while being kept at 20° C. or below, is added dropwise an acrylic compound as such (when liquid) or dissolved in water or methanol (when solid). The amount of the acrylic compound can be varied within the range from 0.1 to 200 mole-% of poly(allylamine). After completion of the dropwise addition, the mixture is stirred for about 2 hours, then at 40° to 50° C. for 1 to 2 hours to allow the reaction to complete.

The flow chart of the preparation of poly(allylamine) derivatives according to this invention is as follows:

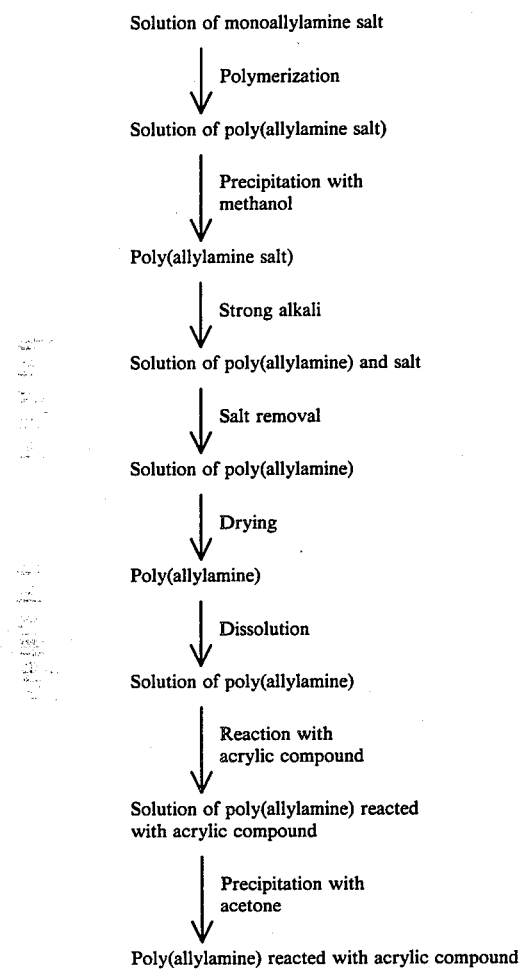

In the above process, step (2) of precipitation with methanol, step (4) of salt removal, step (5) of drying, step (6) of dissolution, and step (8) of precipitation with acetone may be omitted according to circumstances.

iii. In the preparation of poly(N-methylated allylamine) according to this invention poly(allylamine salt) can be used as such or after conversion into poly(allylamine). Poly(allylamine) is obtained in the following manner:

Poly(allylamine salt) is dissolved in water and mixed with equimolar amount of a strong alkali such as sodium hydroxide. The by-product salt (sodium chloride when monoallylamine hydrochloride and sodium hydroxide were used) is removed from the reaction mixture by dialysis, ultrafiltration, or gel permeation. The dialyzate or filtrate is then dehydrated and dried. The procedure of preparing poly(N-methylallylamine) or poly(N,N-dimethylallylamine) by reacting the resulting poly(allylamine) or a salt thereof with formic acid and formaldehyde is as described below.

Poly(allylamine) or a salt thereof is dissolved in water or methanol or a mixture of a polar solvent and water or methanol. The concentration of the resulting solution is 5 to 60%. To the solution, while being kept at 30° C. or below by cooling, is added dropwise formic acid followed by an aqueous solution of formaldehyde. In the case of poly(N-methylallylamine), the necessary amounts of formic acid and formaldehyde are 1.5 to 4 moles of the former and 1 to 1.5 moles of the latter for 1 mole of poly(allylamine) in terms of allylamine. In the case of poly(N,N-dimethylallylamine), the necessary amounts of formic acid and formaldehyde are 3 to 8 moles of the former and 2 to 3 moles of the latter. The degree of melthylation can be controlled by varying the amounts of formic acid and formaldehyde.

After the addition of formic acid and formaldehyde, the temperature of the mixture is elevated gradually to 70° to 90° C. Carbon dioxide is evolved vigorously. After the mixture has been kept at the same temperature for 4 to 6 hours, the gas evolution ceases when the reaction is deemed to be complete. After completion of the reaction, a large volume of acetone is added to precipitate the poly(N-methylated allylamine). The precipitate is collected by filtration to remove the unreacted formaldehyde and formic acid, then dried to yield formic acid salt of poly(N-methylallylamine) or poly(N,N-dimethylallylamine). If necessary, the formic acid salt is converted into free poly(N-methylallylamine) or poly(N,N-dimethylallylamine.

The invention is further illustrated with reference to examples.

REFERENTIAL EXAMPLE 1

Preparation of Poly(allylamine)

An aqueous solution containing 59.1% of monoallylamine hydrochloride was prepared by adding dropwise 104.2 g of 35-% hydrochloric acid to 57.1 g of monoallylamine at 10° to 20° C. The resulting solution was concentrated in a rotary evaporator to a concentration of 75%. To the concentrated solution maintained at 60° C., was added dropwise over a period of 3 hours a 15-% aqueous solution containing 2.34 g (2.5 % by weight based on the monomer) of 2,2'-diamidinyl-2,2'-azopropane hydrochloride. After completion of the addition, the mixture was kept at 60° C. for 15 hours. After completion of the polymerization, the polymerization mixture was poured into a large volume of methanol to precipitate a polymer. The polymer was collected by filtration and dried. The yield was 86 g.

An aqueous solution was prepared by adding 30 g of water to 20 g of the poly(allylamine hydrochloride) obtained above. To the resulting solution, was added 21.4 g of 40-% sodium hydroxide solution. The mixture was dialyzed through hollow fibers for 24 hours to remove the by-product sodium chloride. The dialyzed solution was concentrated to 100 g and lyophilized to yield 11.6 g of poly(allylamine)

EXAMPLE 1

Preparation of Reaction Product between Poly(allylamine) and Acrylic Compound.

A 11.4 g portion (0.2 mole in terms of allylamine) of the poly(allylamine) was dissolved in 30 g of methanol. To the resulting solution, while being maintained at 20° C. or below, was added dropwise 10.6 g (0.2 mole) of acrylonitrile, while slight evolution of heat being noticed. After completion of the addition, the mixture was kept at the same temperature for 2 hours. The mixture was then heated at 40° C. for 2 hours to complete the reaction. The reaction mixture was poured into a large volume of acetone to precipitate the reaction product. After being collected by filtration and dried, the precipitate gave the following results of elementary analysis:

|  | c % | H % | N % |
|---|---|---|---|
| Found | 65.93 | 9.12 | 24.95 |
| Calculated* | 65.42 | 9.15 | 25.43 |

Note:
The values calculated on the assumption that one molecule of acrylonitrile had added to each amino group of poly(allylamine).

From the above results and the results of analysis of IR absorption spectrum (strong absorption at 2,260 cm$^{-1}$ corresponding to the nitrile group) and $^1$H-NMR spectrum, it may be concluded that the reaction product is a polymer formed by the addition of one molecule of acrylonitrile to each amino group of poly(allylamine).

EXAMPLE 2

Preparation of reaction product between poly(allylamine) and acrylic compound.

To a solution of 11.4 g of poly(allylamine), obtained as in Referential Example 1, in 30 g of methanol, while being maintained at 20° C. or below, was added dropwise a solution of 14.2 g (0.2 mole) of acrylamide in 20 g of methanol. Slight evolution of heat was noticed. After completion of the addition, the mixture was kept at the same temperature for 2 hours, then at 40° C. for 2 hours to allow the reaction to complete. The reaction mixture was poured into a large volume of acetone to precipitate the reaction product. After being collected by filtration and dried, the precipitate gave the following results of elementary analysis:

|  | c % | H % | N % |
|---|---|---|---|
| Found | 56.34 | 9.50 | 21.97 |
| Calculated* | 56.22 | 9.44 | 21.85 |

Note:
*The values calculated on the assumption that one molecule of acrylamide had added to each amino group of poly(allylamine).

From the above results together with the result of analysis of the IR absorption spectrum (strong absorption at 1,670 cm$^{-1}$ corresponding to the carbonyl group in the amide linkage) and $^1$H-NMR spectrum, it may be concluded that the reaction product is a polymer formed by the addition of one molecule of acrylamide to each amino group of poly(allylamine).

EXAMPLE 3

Preparation of reaction product between poly(allylamine) and acrylic compound.

To a solution of 11.4 g of poly(allylamine), which was obtained as in Referential Example 1, in 30 g of water, while being maintained at 20° C. or below, was added dropwise a solution of 18.8 g (0.2 mole) of sodium acrylate in 30 g of water, meanwhile mild evolution of heat having been noticed. After completion of the addition, the mixture was kept at the same temperature for 2 hours, then at 40° C. for 2 hours to allow the reaction to complete. The reaction mixture was poured into a large volume of acetone to precipitate the reaction product. After having been collected by filtration and dried, the precipitate gave the following results of elementary analysis:

|  | c % | H % | N % |
|---|---|---|---|
| Found | 48.01 | 6.71 | 9.43 |
| Calculated* | 47.68 | 6.67 | 9.27 |

Note:
*The values calculated on the assumption that one molecule of sodium acrylate had added to each amino group of poly(allylamine).

From the above results together with the results of analysis of the IR absorption spectrum and $^1$H-NMR spectrum, it may be concluded that the reaction product is a polymer formed by the addition of one molecule of sodium acrylate to each amino group of poly(allylamine).

EXAMPLE 4

Preparation of reaction product bewteen poly(allylamine) and acrylic compound To a solution of 11.4 g of poly(allylamine), which was obtained as in Referential Example 1, in 30 g of methanol, while being maintained at 20° C. or below, was added dropwise 17.2 g (0.2 mole) of methyl acrylate, meanwhile slight evolution of heat having been noticed. After completion of the addition, the mixture was kept at the same temperature for 2 hours, then at 40° C. for 2 hours to allow the reaction to complete. A large volume of acetone was added to the reaction mixture to precipitate the reaction product. After having been collected by filtration and dried, the precipitate gave the following results of elementary analysis:

|  | C % | H % | N % |
|---|---|---|---|
| Found | 59.11 | 9.30 | 9.85 |
| Calculated* | 58.72 | 9.15 | 9.78 |

Note:
*The values calculated on the assumption that one molecule of methyl acrylate had added to each amino group of poly(allylamine).

From the above results together with the results of analysis of the IR absorption spectrum and $^1$H-NMR spectrum, it may be concluded that the reaction product is a polymer formed by the addition of one molecule of methyl acrylate to each amino group of poly(allylamine).

REFERENTIAL EXAMPLE 2

Preparation of Poly(allylamine)

To 57.1 g of allylamine, was added dropwise, at 10°-20° C., 104.2 g of 35-% hydrochloric acid to yield an aqueous solution containing 59.1 % of allylamine hydrochloride. The resulting aqueous solution was concentrated in a rotary evaporator to a concentration of 75%. To the concentrated solution, while being maintained at 60° C. by heating, was added dropwise over a period of 3 hours a 15-% aqueous solution containing 2.34 g (2.5% based on monomer) of 2,2'-diamidinyl-2,2'-azopropane hydrochloride. After completion of the dropwise addition, the mixture was kept at 60° C. for 15 hours to complete the polymerization. The polymerization mixture was poured into a large volume of methanol to precipitate the polymer which was then collected by filtration and dried. The yield was 86 g.

A 20 g portion of the resulting poly(allylamine hydrochloride) was dissolved in 30 g of water. To the resulting solution, was added 21.4 g of a 40-% aqueous sodium hydroxide solution. The mixture was dialyzed through hollow fibers for 24 hours to remove the by-produce sodium chloride. The dialyzed solution was concentrated to 100 g and lyophilized to yield 11.6 g of poly(allylamine)

EXAMPLE 5.

Preparation of Poly(N-Methylated Allylamine). To a solution of 11.4 g (0.2 mole in terms of allylamine) of the resulting poly(allylamine) in 30 g water, while being maintained at 30° C. or below, was added dropwise 40.9 g (0.8 mole) of 90-% formic acid followed by 37.7 g (0.44 mole) of 35-% aqueous formaldehyde solution. After the addition, the mixture was gradually heated to 80° C., meanwhile violent evolution of carbon dioxide having been noticed. The mixture was kept at 80° C. for 5 hours when the gas liberation had ceased to occur, indicating the completion of reaction. The reaction mixture was poured into a large volume of acetone to precipitate the reaction product which was then collected by filtration and dried to yield 24.2 g of a white powder. Upon elementary analysis, this powder gave the following results:

|  | C % | H % | N % |
|---|---|---|---|
| Found | 55.10 | 9.91 | 10.44 |
| Calculated* | 54.94 | 9.99 | 10.68 |

Note:
*Calculated for formic acid salt of poly(N,N—dimethylallylamine).

Also from the analysis of $^1$H-NMR spectrum, the polymer was confirmed to be poly(N,N-dimethyl- allylamine).

EXAMPLE 6

Preparation of poly(N-methylated allylamine)

In a manner similar to that in Example 5, 11.4 g of poly(allylamine), which was prepared as in Referential Example 2., was reacted with 20.5 g (0.4 mole) of 90-% formic acid and 18.9 g (0.22 mole) of 35-% formalin to yield 22.0 g of the reaction product. Upon elementary analysis, this substance gave the following results:

|  | C % | H % | N % |
|---|---|---|---|
| Found | 50.73 | 9.18 | 12.24 |
| Calculated* | 51.26 | 9.47 | 11.96 |

Note:
*Calculated for formic acid salt of poly(N—methylallylamine).

Also from the analysis of $^1$H-NMR spectrum, the polymer was confirmed to be poly(N-methylallylamine).

What is claimed is:

1. A process for producing a poly(allylamine) derivative, which comprises polymerizing an inorganic acid salt of monoallylamine with a radical-polymerization initiator having an azo group in the molecule, converting the resulting poly(allylamine salt) into poly(allylamine), and reacting the resulting poly(allylamine) with an acrylic compound having an electron attracting group adjacent to the double bond.

2. A process according to claim 1, wherein the radical-polymerization initiator having an azo group in the molecule is a salt of an azo compound represented by the following general formula [I] with an inorganic or organic acid selected from the group consisting of hydrochloric acid, sulfuric acid, phosphoric acid, alkylsulfuric acids, p-toluenesulfonic acid, formic acid, acetic acid, and propionic acid:

$$R_1-N=N-R_2 \qquad [I]$$

wherein at least one, preferably both, of $R_1$ and $R_2$ is a group which contains a cationizable nitrogen atom and which is selected from the group consisting of aminoalkyl, aminoaryl, amidinylalkyl, amidinylaryl, aminoalkaryl, aminoaralkyl, amidinylaralkyl, amidinylalkaryl, cyanoaminoalkyl, and cyanoaminoalkaryl; when only one of $R_1$ and $R_2$ is a group containing a cationizable nitrogen atom, the other is a group selected from the group consisting of alkyl, aryl, alkaryl, aralkyl, cyanoalkyl, cyanoaryl, cyanoalkaryl, and cyanoaralkyl; and $R_1$ and $R_2$ may jointly form a single alkylene group represented by the general formula $$\overset{(a)}{\underset{X}{R}}\overset{(b)}{} \qquad [II]$$

wherein R is a group selected from the group consisting of alkylene, alkylalkylene, and arylalkylene; covalent bonds (a) and (b) combine with each nitrogen atom of the azo group to form an azo-containing ring; and X is a group containing a cationizable nitrogen atom.

3. A process according to claim 1, wherein the acrylic compound is selected from the group consisting of acrylonitrile, methacrylonitrile, acrylamide, methacrylamide, acrylic acid, methacrylic acid, acrylic esters, methacrylic esters, inorganic acid salts of acrylic acid, and inorganic acid salts of methacrylic acid.

4. A process for producing a poly(N-methylated allylamine), which comprises polymerizing an inorganic acid salt of monoallylamine with a radical-polymerization initiator having an azo group in the molecule, and reacting the resulting poly(allylamine salt) or the poly(allylamine) derived therefrom by the action of an alkali with formic acid and formaldehyde.

5. A process according to claim 4, wherein the radical-polymerization initiator having an azo group in the molecule is a salt of an azo compound represented by the following general formula [I] with an inorganic or organic acid selected from the group consisting of hydrochloric acid, sulfuric acid, phosphoric acid, alkylsulfuric acids, p-toluenesulfonic acid, formic acid, acetic acid, and propionic acid:

$$R_1-N=N-R_2 \qquad [I]$$

wherein at least one, preferably both, of $R_1$ and $R_2$ is a group which contains a cationizable nitrogen atom and which is selected from the group consisting of aminoalkyl, aminoaryl, amidinylalkyl, amidinylaryl, aminoalkaryl, aminoaralkyl, amidinylaralkyl, amidinylalkaryl, cyanoaminoalkyl, and cyanoaminoalkaryl; when only one of $R_1$ and $R_2$ is a group containing a cationizable nitrogen atom, the other is a group selected from the group consisting of alkyl, aryl, alkaryl, aralkyl, cyanoalkyl, cyanoaryl, cyanoalkaryl, and cyanoaralkyl; and $R_1$ and $R_2$ may jointly form a single alkylene group represented by the general formula

 [II]

wherein R is a group selected from the group consisting of alkylene, alkylalkylene, and arylalkylene; covalent bonds (a) and (b) combine with each nitrogen atom of the azo group to form an azo-containing ring; and X is a group containing a cationizable nitrogen atom.

* * * * *